United States Patent [19]

MacKay et al.

[11] Patent Number: 5,187,630
[45] Date of Patent: Feb. 16, 1993

[54] MULTI-PARAMETER VARIABLE SCALE ROTARY SWITCH

[75] Inventors: Michael T. MacKay, Vallejo; Robert Duffy, Milpitas; Lee A. Cotterill, San Jose; William Herz, Newark; Joe McArdle, Mountain View, all of Calif.

[73] Assignee: Sony Corporation of America, Park Ridge, N.J.

[21] Appl. No.: 679,745

[22] Filed: Apr. 3, 1991

[51] Int. Cl.⁵ ............... G11B 33/00; G11B 15/50; H01H 13/62; H01H 19/14
[52] U.S. Cl. ................... 360/137; 360/10.3; 360/73.08; 200/565; 200/DIG. 34
[58] Field of Search ............ 360/137, 10.3, 71, 73.08; 192/84 C; 200/336, 564, 565, DIG. 34; 74/553

[56] References Cited

U.S. PATENT DOCUMENTS

| | | | |
|---|---|---|---|
| 4,425,520 | 1/1984 | Hiraga | 192/84 C |
| 4,428,005 | 1/1984 | Kubo | 360/137 |
| 4,455,886 | 6/1984 | Schmitt | 200/565 |
| 4,786,982 | 11/1988 | Wakahara et al. | 360/10.3 |
| 4,866,542 | 9/1989 | Shimada et al. | 360/10.3 |
| 5,046,594 | 9/1991 | Kakinuma | 192/84 C |
| 5,128,503 | 7/1992 | Frantz | 200/336 |

FOREIGN PATENT DOCUMENTS 61-160859 7/1986 Japan .

*Primary Examiner*—Stuart S. Levy
*Assistant Examiner*—Craig A. Renner
*Attorney, Agent, or Firm*—Blakely Sokoloff Taylor & Zafman

[57] ABSTRACT

A switch that can vary at least two controllable parameters and can vary the upper, lower and any intermediary limits of the switch. The switch has a pair of nested coaxial rotary knobs each attached by shafts to sensors that determine the radial position of a reference point on each knob. The knobs rotate with respect to each other and are constructed to allow rotation of the knobs with one hand. The sensors are attached to the controls of the parameters, such that rotation of the knobs varies the output of the parameters. The sensors are coupled to a magnetic clutch that engages and prevents rotation of one of the knobs, when the knob is rotated into a predetermined radial position. A computer can be connected to the magnetic clutch and sensors. The computer receives input signals from the sensors and produces an output signal to the clutch, to engage the clutch and prevent rotation of the knob in accordance with a computer program within the computer. The integration of a computer allows the limits of a switch to be controlled by changing the computer program. The switch has a button in the center that can be pushed in relative to the knobs. The button is attached by a shaft to a micromotion switch that can also be coupled to the computer. The button can be used as a start/stop switch, or to change the functions controlled by the knobs. The switch can also be constructed such that the knobs are connected to another sensor, such that the equipment can be immediately stopped by pusing the knobs down.

58 Claims, 3 Drawing Sheets

MULTI-PARAMETER VARIABLE SCALE ROTARY SWITCH

BACKGROUND OF THE INVENTION

1. Field of the Invention

This invention relates to rotary variable switches typically used to control the speed of a video cassette recorder.

2. Description of Related Art

When viewing or editing a prerecorded video tape, it is desirable to control the speed of the tape. Video editing equipment typically has a console with a plurality of control switches to vary the frame speed and the audio levels of the picture. In addition to the basic start and stop buttons, most consoles have knobs to control the shuttle speed (fast forward and reverse) and another switch to move the tape from frame to frame, commonly referred to as jogging. Typically, each function is controlled by a different knob. That is, there is usually a start/stop button, a separate knob to control shuttle speed and yet another knob to control the jogging of the film. It would be preferable to incorporate all of these functions in one switch so that the various operating parameters can be controlled by one hand or a pair of fingers, greatly reducing the complexity of use and freeing the other hand to control another function such as sound.

Most switches have upper and lower limits, which for rotary knobs is implemented by limiting the clockwise and counterclockwise rotational travel of the switch. In addition, such switches will have intermediary limits that define different scales within the range of the controlled function. For instance, audio equipment will have a volume knob that rotates and stops at 10, 20 etc., which define the varying levels of sound produced by the system. The upper and intermediary limits of the switch are usually determined and fixed when the unit is constructed. The upper or intermediary limits can not be changed once the switch has been assembled and installed into the equipment. It would be desirable to have a switch with limits that can be varied without mechanically changing the control. This would be particularly useful for a console that can be attached to both video and audio recording equipment, wherein the switch has certain predetermined limits and scales for an audio system and a different set of limits and scales for video equipment.

SUMMARY OF THE INVENTION

The present invention is a switch that can vary at least two controllable parameters and change the upper, lower and any intermediary limits of the switch. The switch has a pair of nested coaxial rotary knobs each attached by shafts to sensors that determine the radial position of a reference point on each knob. The knobs rotate only with respect to each other and are constructed to allow rotation of the knobs with one hand. The sensors are attached to the controls of the parameters, such that rotation of the knobs varies the output of the parameters. The parameter may be the speed of a video tape or the sound level of an audio system. The sensors are coupled to a magnetic clutch that engages and prevents rotation of one of the knobs, when the knob is rotated to a predetermined radial position or positions. A computer can be connected to the magnetic clutch and the sensors. The computer receives input signals from the sensors and produces an output signal to the clutch, to engage the clutch and to prevent rotation of the knob in accordance with a computer program within the computer. The computer can be attached to a peripheral device such as a disk drive, whereby a user can change the limits of the switch by inserting a different disk or selecting a prompt on a menu that contains a plurality of programs on a disk drive. This allows the limits to be easily changed, such that the switch can be attached to various types of audio, video, recording or editing equipment, wherein each type of device has a different set of control limits.

In the preferred embodiment, the rotary knob has a button in the center, that can be pushed in relative to the knobs. The button is attached by a shaft to another sensor that is also coupled to a parameter and the computer. The button can be used as a start/stop switch, or to change the functions controlled by the knobs. For instance, one push on the button can start the equipment, two pushes to stop, three pushes could change one of the knob parameters from controlling frame speed to audio levels and so forth and so on. The switch can also be constructed such that the knobs are connected to another sensor, such that the equipment can be immediately stopped by pushing the knobs down.

Therefore it is an object of this invention to provide a switch that can vary at least two parameters with one hand and that has an electrical clutch that prevents rotation of one of the knobs, when a reference point of the knob is in a predetermined radial position.

It is also an object of this invention to provide a rotary switch that has outer and intermediary limits that can be varied by a computer program.

It is also an object of this invention to provide a video console with a single switch that can control the shuttle speed, jogging speed, play speed, a start/stop button and an emergency stop button all in one switch.

BRIEF DESCRIPTION OF THE DRAWINGS

The objects and advantages of the present invention will become more readily apparent to those skilled in the art after reviewing the following detailed description and accompanying drawings, wherein.

DETAILED DESCRIPTION OF THE INVENTION

A rotary switch, which can vary at least two controllable parameters as well as change the upper, lower and any intermediary limits of the switch, is disclosed. In the following description, for purposes of explanation, specific nomenclature is set forth to provide a thorough understanding of the present invention. However, it will be apparent to one skilled in the art that these specific details are not required in order to practise the present invention. In other instances, well known circuits and devices are shown in block diagram form in order not to obscure the present invention unnecessarily.

Figure 1:
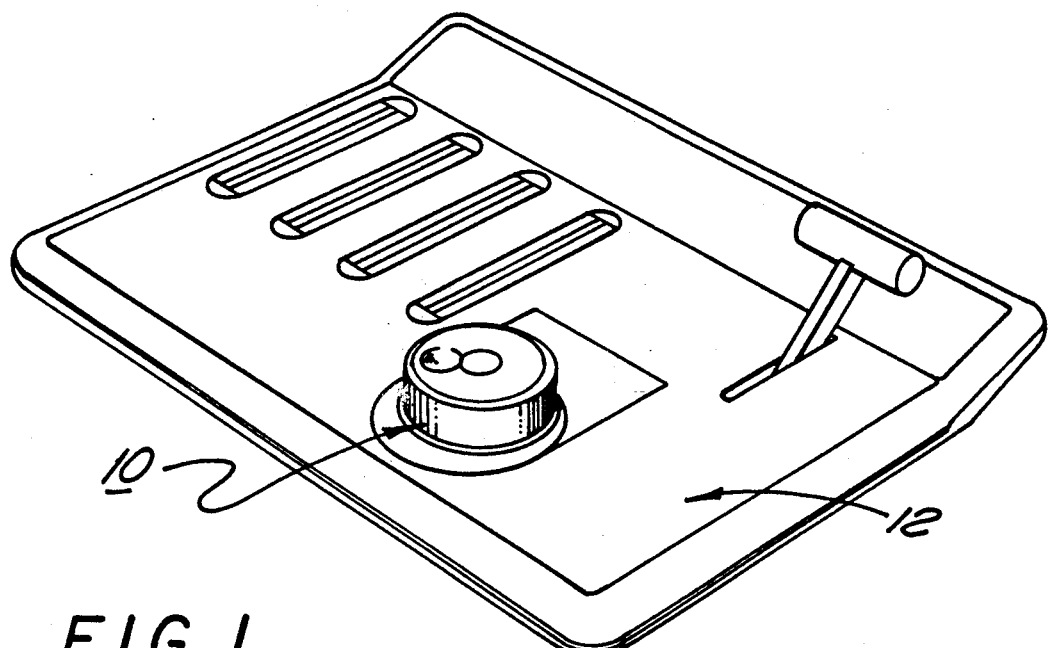
FIG. 1 is a perspective view of a console with a switch of the present invention.

Referring to the drawings more particularly by reference numbers, FIG. 1 shows a switch 10 that is operatively connected to a console 12. The console 12 can be connected to any device that has controllable parameters. For instance the device can be a video cassette recorder typically sold for use with a home television, or the device can be a motion picture editing machine wherein the individual frames of the picture are displayed at various speeds and directions, and stopped for viewing and editing. Although the switch 10 to be discussed is used in a console that controls the motion and speed of a prerecorded video tape, it is to be understood that the switch 10 can be used in any device or equipment that utilizes switches or other control members. To further explain the invention the parameters of a video cassette recorder (VCR) will be defined. Typically, a VCR will have a shuttle speed that is commonly referred to as fast forward and rewind. The shuttle speeds allow the video tape to be moved rapidly in either a forward or reverse direction. Shuttle speeds will typically range from +100X to −100X for digital VCRs and +50 to −50 for analog units, where X is the normal speed of the tape. In addition to controlling shuttle speed, it is also possible to move the videotape frame by frame, wherein the speed of the frame to frame movement (known as jogging speed) can be varied. Also, as with every dynamic system there is a start and a stop button.

Figure 2:
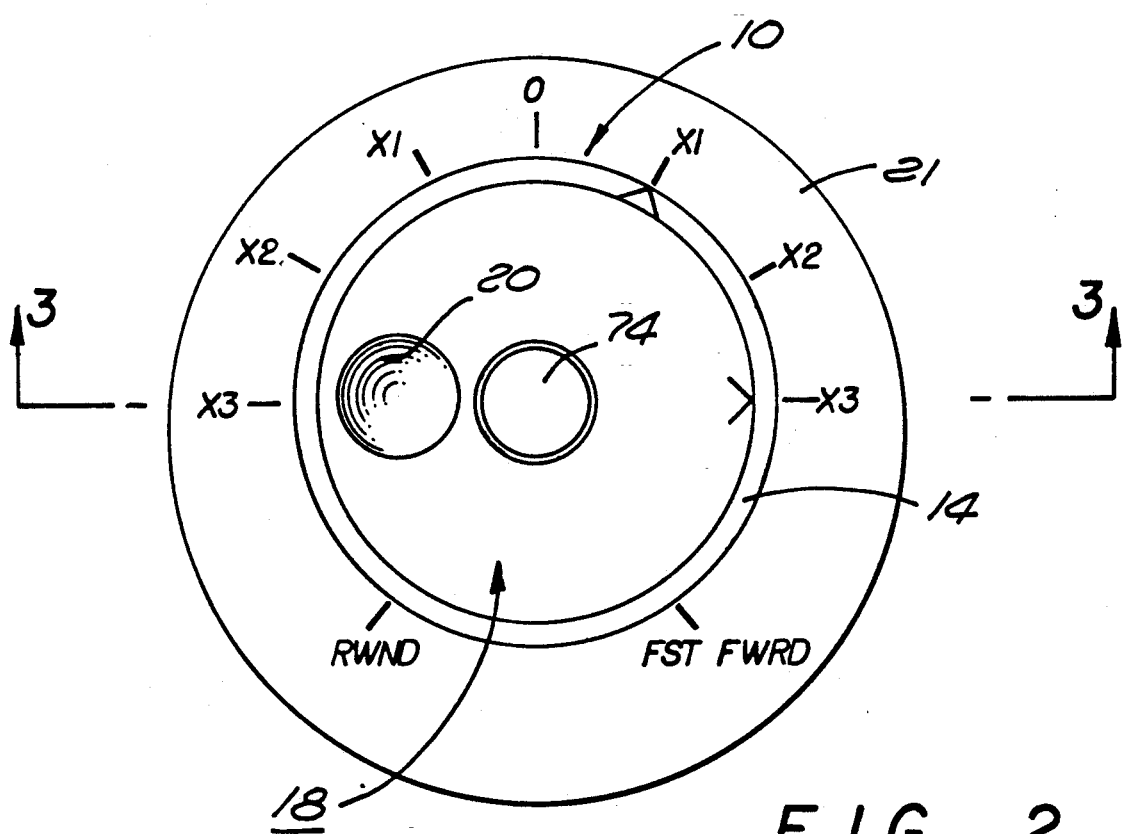
FIG. 2 is a top view of the switch showing nested coaxial knobs that can only rotate relative to each other and a start button in the center.
Figure 3:
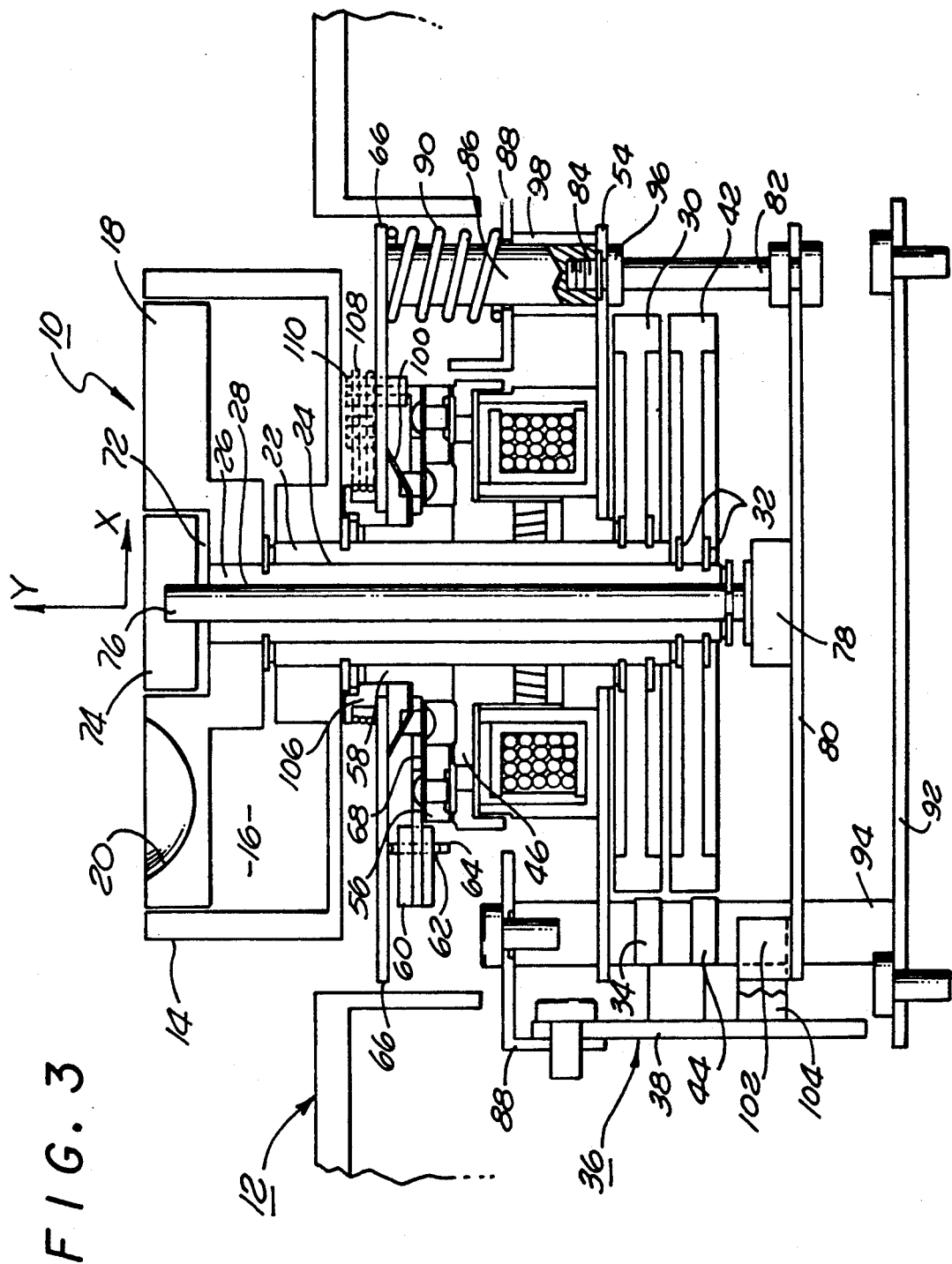
FIG. 3 is a side cutaway view of FIG. 2 as identified by cutting line 3 in FIG. 2 showing coaxial shafts connected to the knobs and a pair of magnetically coupled sensors, the shafts connected to the knobs move the plate that triggers an optical switch.
Figure 4:
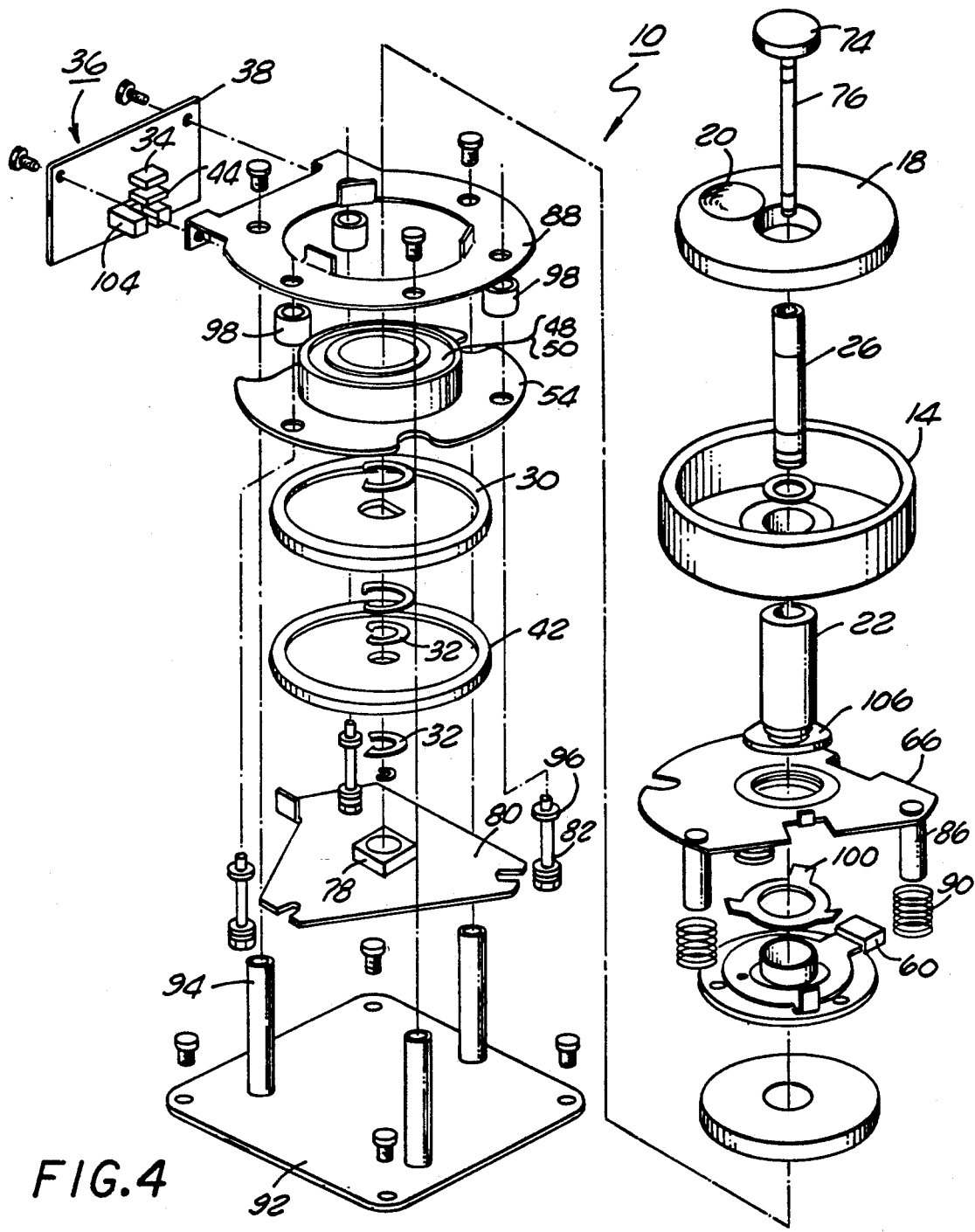
FIG. 4 is an exploded perspective view showing the various parts of the switch.

FIGS. 2-4 show the preferred embodiment of the present invention. The switch 10 has a first knob 14 located above the console 12, so that the knob 14 can rotate relative to the console 12. The first knob 14 has an inner cavity 16, that allows a second knob 18 to be nested within the first knob 14. The second knob 18 can rotate relative to the first knob 14 and the console 12. The second knob 18 may have a finger detent 20 that allows rotation of the second knob 18 with the movement of a finger. The first knob 14 is also operable with fingers, such that both knobs may be turned with a single hand. As shown in FIG. 2, each knob may have an arrow or other indicator to signify a point of origin or reference point. The console 12 may have a template 21 to indicate the relative radial position of the reference points with respect to the console 12.

Referring to FIG. 3, the first knob 14 is connected to a first hollow shaft 22 that extends along a vertical axis y. The first shaft 22 has a bore 24 along the longitudinal axis and is attached to the first knob 14 such that the first shaft 22 rotates about the vertical axis with the rotation of the first knob 14. Connected to the second knob 18 is a second hollow shaft 26 with a bore 28 extending along the longitudinal axis of the second shaft 26. The second shaft 26 again being attached to the second knob 18 to rotate about the vertical axis along with the rotation of the second knob 18. At the end of the first shaft 22 is a first disk 42 attached to the first shaft 22 by a pair of retainer clips 32. The first shaft 22 preferably having a D shape in the lower portion, wherein the retainer clips 32 are C clips that engage the flat portion of the first shaft 22. The disk 42, positioned along a horizontal axis X, is attached so that it rotates with the first shaft 22 and first knob 14.

Adjacent the first disk 42 is a first sensor 44 that senses the relative position of the first disk 42 and first knob 14. In the preferred embodiment, the first disk 42 is constructed to have a plurality of magnetic domains throughout the first disk 42, that correspond to different radial positions of the reference point of the first knob 14. The first sensor 44 is sensitive to the magnetic field of the magnetic domains such that when the first disk 42 rotates and a magnetic domain is immediately adjacent the first sensor 44, an electrical current is induced in the first sensor 44. Such a device, referred to as a Hall effect sensor, is known in the art and is commercially available. When a current is induced in the first sensor 44, the sensor sends an input signal to the circuit board 38 which communicates with a computer 36. At the end of the second shaft 26 is a second disk 30 attached by a pair of retainer clips 32. The second disk 30 is coupled to a second sensor 34 which again senses the relative radial position of the second disk 30 and the second knob 18. Although a Hall effect sensor has been described, it is to be understood that any type of sensor that can sense the relative radial position of the disk and the knobs can be used. For instance, the sensor might be a photosensitive cell and the disk may have a plurality of reflective surfaces along the periphery of the disk such that when the disk rotates, light emitted by the cell is either reflected or not reflected back to the cell depending on the position of the disk.

Figure 5:
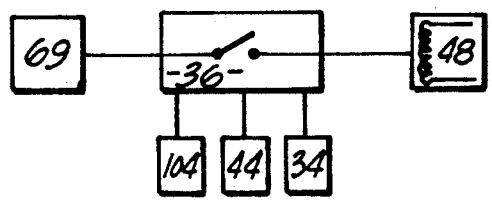
FIG. 5 is a schematic diagram showing the interrelationship of the sensors, the computer and the magnetic clutch.

Attached to the first shaft 22 is an annular flange 46 that rotates with the first shaft 22 and first knob 14. Adjacent the annular flange 46 is a magnetic coil 48 wrapped around a bobbin 50 which is contained by a U shaped housing 52. The housing 52 is attached to a coil plate 54 which does not rotate with the shafts. Also adjacent the annular flange 46 is a clutch plate 56 that is attached to a clutch bracket 58. The clutch bracket 58 has a stop flange 60 that extends into a slot 62 between two flanges 64 of a retainer bracket 66, see also FIG. 4. The retainer bracket 66 is fixed relative to the shafts, wherein the stop flange 60 prevents the clutch bracket 58 and plate 56 from rotating with the shafts. Between the clutch bracket 58 and the clutch plate 56 is a spring 68. Normally there is a gap between the clutch plate 56 and the annular flange 46 so that the annular flange 46 can rotate relative to the plate 56. When a current flows through the coil 48, the coil 48 emits a magnetic field which causes the spring 68 to bend toward the annular flange 46. This causes the clutch plate 56 to engage the flange 46 and limit the rotational movement by means of the retainer bracket 66 of the flange 46, shaft 22 and the first knob 14. A retainer bracket 100 is used to support the engaged clutch plate 56 with annular flange 46. As the clutch assembly is engaged, extending plate 110, connected to the clutch plate 56, is used along with torsional spring 108 to cause a resistance in the radial motion of the knobs before a stop flange 60 has completely engaged with annular flange 46. This resistance provides the feel of the clutch function as opposed to an abrupt halt in the rotation of the knobs which would occur without such resistance. As shown in FIG. 5, the coil 48 receives current from a power supply 69 that is operatively connected to the computer 36, which has switching means to allow the coil 48 to draw poeer from the power supply 69.

In operation, the first knob 14 is rotated until a predetermined location of the first disk 42 is adjacent to the first sensor 44. The computer 36 typically has a counting means which counts every time a magnetic domain of the disk passes the sensor and sends an input signal to circuit board 38 and computer 36. Again, although a Hall effect sensor is described, any type of sensor could be used to sense the relative radial position of the disk and the knobs. The computer also has memory and processing means such that when a predetermined number of input signals are counted, the computer 36 causes the coil 48 to energize, which emanates a magnetic field causing spring 68 to be pulled toward the annular flange 46. The pulled spring 68 and the retainer bracket 100 hold the clutch plate into position, and the stop flange 60, attached to the clutch bracket 58 and the clutch plate 56, limits the clutch bracket 58 and clutch plate 56 from rotating with annular flange 46 and first shaft 22. This arrangement can provide a stop for the rotation of the first knob 14 such that the parameter being controlled by the knobs does not exceed a certain value. For example, the knob could control the volume of an audio system and a programmed level of computer 36 could control the sound such that the sound does not exceed a certain limit.

The computer 36 can be constructed to be programmable by the user of the switch such that the limits of the switch can be changed. For instance, a disk drive and keyboard interface may be attached to the computer to allow a user to insert new software that changes the limits of switch. The software could be inserted by a "floppy" disk and/or the different programs can be stored on a hard disk, wherein the user can vary the limits by selecting a prompt or inputting new values. Referring to FIG. 2, one computer program may prevent the first knob 14 from moving the reference arrow past X1, while another program may allow rotation to X3. Yet another program could prevent the knob from rotating into rewind (counterclockwise of 0). The direction of knob motion relative to its effect is also programmable. This provides an advantage over switches in the prior art which had only one upper and lower limit. The varying limits allow the switch 10 and console 12 to be used in both audio and video systems of different sizes and types.

The computer/clutch assembly can also be used to detent the knob as it is rotated relative to the console, providing incremental stops between the limits. Referring to FIG. 2 it can be seen that the first knob 14 can be rotated from 0 to a radial position designated X1. When the first knob 14 approaches X1, the computer 36 engages the clutch to slow down and stop the knob 14 from moving. The computer may have an internal timer that releases the clutch after a predetermined amount of time so that the knob can again be rotated. The cycle is repeated again when the knob approaches the radial position designated X2 and so forth and so on. The computer 36 can be reprogrammed such that the radial positions at which the switch stops can be changed. It being understood that the detent characteristic can be combined with the outer limits discussed earlier. The computer 36 can also be connected to the means of varying the parameters. When a magnetic domain of a disk passes a sensor, the sensor will provide an appropriate output signal to vary the parameter. For example, if the second knob 18 is used to jog a video tape, the rotation of the second knob 18 and second disk 30 will provide a plurality of input signals to the computer 36, which further provides a plurality of output signals to change the controlled device, such as to change the speed or direction of the tape accordingly.

As shown in FIGS. 2 and 3 the second knob 18 may have an inner cavity 72 that houses a button 74. The button 74 is attached to a third shaft 76 that extends through the bore 28 of the second shaft 26. At the end of the third shaft 76 is a micromotion switch 78 attached to a switch plate 80. Connected to the switch plate 80 are three retainer screws 82 that extend through clearance holes 84 in the coil plate 54 and thread into three plunger pins 86, see also FIG. 4. The plunger pins 86 are attached to the retainer bracket 66 which is spaced from a mounting bracket 88 by three helical springs 90. The mounting bracket 88 is attached to a lower mounting plate 92 by three mounting pins 94. The mounting plate 92 is fastened to the console 12, wherein the mounting bracket 88 and plate 92 are fixed with respect to the rest of the switch. The circuit board 38 is also attached to the mounting bracket 88 such that all sensors attached to the circuit board 38 are fixed relative to the rest of the switch. The retaining screws 82 may have a shoulder 96 to keep the coil plate 54 and the switch plate 80 spaced apart a predetermined distance. The helical springs 90 bias the retainer bracket 66 toward the knobs. The plunger pins 86 may have coaxial bushings 98, that together with the retaining screw shoulders 96 prevent the retainer bracket 66 from being moved by the springs 90 beyond a predetermined distance. Located between the clutch bracket 58 and the retainer bracket 66 is a retainer spring 100 that further biases the retainer bracket 66 away from the clutch bracket 58.

The switch plate 80 has a switch paddle 102 that extends across an optical sensor 104 which is attached to the circuit board 38 and computer 36. The pushing of knobs 14 and 18 moves down in switch bracket 80 such that the switch paddle 102 is no longer blocking a light beam traveling across the optical sensor 104. The unblocking of the light beam produces an input signal to the computer 36. When knobs 14 and 18 are released, spring 90 pushes the switch plate 80 and switch paddle 102 back into the original position. The pushing down of knobs 14 and 18 could be used as an emergency stop.

Button 74 can be used to start and stop the parameters that are to be controlled. For instance, if the switch is controlling the motion of a video tape, pushing the button 74 might initiate the playing of the video. The button 74 could also be used to change the parameters to be controlled by the knobs. For example, pushing the button 74 once might make the knobs control the motion of a video tape. Pushing the button 74 twice might allow the user to control the sound of the video tape with the second knob 18. Because the micromotion switch 78 is connected to the computer 36 and board 38, the output function created by pushing the button 74 can be changed and the switch 78 can operate as a separate switch function.

The button 74 itself can pass parameters to the programs within the computer. Although a micromotion switch 78 is described, it is to be understood that another similar sensor can be used, such a pressure transducer that would be sensitive to the downward force of the button 74.

The first knob 14 rests against the annular flange 106, and the annular flange 106 is also connected to the first shaft 22 by a retainer ring. When downward pressure is exerted on knobs 14 and 18, the annular flange 106 is depressed from the connection to the first shaft 22 and from the first knob 14. The depression of annular flange 106 causes a retainer bracket 66, plunger pins 86, and a switch bracket 80 all to be pushed downward. The movement of switch bracket 80 downward moves the switch paddle 102 to create an input signal generated by the optical sensor 104 and input to the computer 36 as described above. The retraction of the brackets and knobs is accomplished by helical spring 90. The downward movement of the knobs can also be used as an emergency stop function to terminate the parameter that is being controlled by the knobs.

Thus what is described is a switch that has two control knobs and two input buttons. When used in a console to control the motion of a video tape, the button 74 could be used to start the tape. The first knob 14 could be used to control the shuttle speed of the picture, wherein the speed can be adjusted from X1, X2, etc. The second knob 18 could control the jogging or the frame to frame movement of the picture. Finally, by pushing the knobs downward the tape can be stopped. When combined with the computer 36 all of the variables mentioned can be changed without mechanically changing the switch.

Although a rotary switch is described that is attached to a computer 36, it is to be understood that the switch can be used without a computer. The sensors can be connected directly to the parameter control means and the power supply 69 of the coil 48. When a magnetic domain is rotated next to a sensor, the sensor closes the line between the power supply 69 and coil 48, energizing the coil 48 and stopping the knob. In this configuration, the sensors and disk act as a switch for the coil. The disk may have two magnetic domains that represent the upper and lower limits of the switch. The disk may further have magnetic domains for the intermediary positions between the outer limits, wherein there would be a timer in the sensor to de-energize the coil after the clutch is engaged a predetermined amount of time.

While certain exemplary embodiments have been described in detail and shown in the accompanying drawings, it is to be understood that such embodiments are merely illustrative of, and not restrictive on the broad invention, and that this invention not be limited to the specific constructions and arrangements shown and described, since various other modifications may occur to those ordinarily skilled in the art.

We claim:

1. A variable rotary switch, comprising:
   a first knob adapted to rotate about a vertical axis, said first knob having a first point of origin that rotates into a plurality of first radial positions about said vertical axis;
   a second knob within said first knob, said second knob being adapted to rotate about said vertical axis relative to said first knob, said second knob having a second point of origin that rotates into a plurality of second radial positions about said vertical axis;
   a hollow first shaft attached to said first knob that rotates with said first knob about said vertical axis, said first shaft extending along said vertical axis;
   a second shaft attached to said second knob that rotates with said second knob about said vertical axis, said second shaft being coaxial with said first shaft;
   first sensor means operatively connected to said first shaft for determining said first radial positions of said first point of origin of said first knob;
   second sensor means operatively connected to said second shaft for determining said second radial positions of said second point of origin of said second knob; and,
   magnetic clutch means operatively connected to said first shaft and said first sensor means for engaging said first shaft and preventing rotation of said first knob when said first point of origin of said first knob is in a predetermined first radial position.

2. The switch as recited in claim 1, wherein said magnetic clutch means prevents said first knob from rotating each time said first point of origin of said first knob is rotated into one of a plurality of predetermined first radial positions.

3. The switch as recited in claim 1, further comprising computer means operatively connected to said sensor means and said magnetic clutch means for receiving input signals from said first sensor means when said first knob rotates into said predetermined first radial position and producing output signals to said magnetic clutch means in accordance with operating instructions within said computer means said output signals cause said magnetic clutch means to engage said first shaft to prevent rotation of said first knob.

4. The switch as recited in claim 2, further comprising computer means operatively connected to said sensor means and said magnetic clutch means for receiving a plurality of corresponding input signals from said first sensor means when said first knob rotates into said plurality of predetermined first radial positions and producing output signals to said magnetic clutch means in accordance with operating instructions within said computer means said output signals cause said magnetic clutch means to engage said first shaft to prevent rotation of said first knob.

5. The switch as recited in claim 3, wherein said computer means is adapted such that said operating instructions can be changed to a new set of operating instructions.

6. The switch as recited in claim 4, wherein said computer means is adapted such that said operating instructions can be changed to a new set of operating instructions.

7. The switch as recited in claim 1, wherein said first sensor means includes a first disk attached to said first shaft, said first disk having at least one first magnetic portion corresponding to said predetermined first radial position, said magnetic portion of said first disk being capable of being magnetically coupled to a first magnetically sensitive sensor located in a position fixed relative to said first disk, said first magnetically sensitive sensor causing said magnetic clutch means to engage said first knob when said first knob is rotated into said predetermined first radial position and said first disk rotates such that said first magnetic portion is magnetically coupled to said first magnetically sensitive sensor.

8. The switch as recited in claim 6, wherein said first sensor means includes a first disk attached to said hollow first shaft, said first disk having a plurality of first magnetic portions corresponding to said plurality of predetermined first radial positions, said first magnetic portions of said first disk being capable of being magnetically coupled to a first magnetically sensitive sensor located in a position fixed relative to said first disk, said first magnetically sensitive sensor creating said plurality of corresponding input signals when said first knob is rotated into said predetermined first radial positions such that said first magnetic portions become magnetically coupled to said first magnetically sensitive sensor.

9. The switch as recited in claim 7, wherein said second sensor means includes a second disk attached to said second shaft, said second disk having at least one second magnetic portion corresponding to at least one predetermined second radial position, said second magnetic portion of said second disk being capable of being mangetically coupled to a second magnetically sensitive sensor located in a position fixed relative to said second disk.

10. The switch as recited in claim 8, wherein said second sensor means includes a second disk attached to said second shaft, said second disk having a plurality of second magnetic portions corresponding to a plurality of predetermined second radial positions, said second magnetic portions of said second disk being capable of being magnetically coupled to a second magnetically sensitive sensor located in a position fixed relative to said second disk, said second magnetic portions and said second magnetically sensitive sensor being magnetically coupled when said second knob is rotated into said predetermined second radial positions such that said second magnetic positions become magnetically coupled to said second magnetically sensitive sensor.

11. The switch as recited in claim 1, wherein said magnetic clutch means includes a first annular flange attached to said first shaft such that said first annular flange rotates with said first shaft, a coil operatively being capable of causing said first annular flange to be coupled with a second annular flange which is attached to a clutch bracket and a clutch plate such that when said first point of origin of said first knob is rotated into said predetermined first radial position, an electrical current is supplied to said coil by an electrical power means that induces a magnetic field in said coil in which a spring is bent causing said second annular flange to be rigidly connected to said first annular flange, wherein said connected flanges prevent said first shaft from rotating.

12. The switch as recited in claim 11, wherein said magnetic clutch means includes a metal spring that pushes said first and second annular flanges into contact when said coil creates said magnetic field.

13. The switch as recited in claim 6, wherein said magnetic clutch means includes a first annular flange attached to said first shaft such that said first annular flange rotates with said first shaft, a coil operatively being capable of causing said first annular flange to be coupled with a second annular flange which is attached to a clutch bracket and a clutch plate such that when said first point of origin of said first knob is rotated into said one of said predetermined first radial positions, an electrical current is supplied to said coil by an electrical power means that induces a magnetic field in said coil in which a spring is bent causing said second annular flange to be rigidly connected to said first annular flange, wherein said connected flanges prevent said first shaft from rotating.

14. The switch as recited in claim 8, wherein said magnetic clutch means includes a first annular flange attached to said first shaft such that said first annular flange rotates with said first shaft, a coil operatively being capable of causing said first annular flange to be coupled with a second annular flange which is attached to a clutch bracket and a clutch plate such that when said first point of origin of said first knob is rotated into said one of said predetermined first radial positions, an electrical current is supplied to said coil by an electrical power means that induces a magnetic field in said coil in which a spring is bent causing said second annular flange to be rigidly connected to said first annular flange, wherein said connected flanges prevent said first shaft from rotating.

15. The switch as recited in claim 14, wherein said first and second knobs control first and second parameters each have varying scales, wherein rotation of said knobs varies said scales of said first and second parameters.

16. The switch as recited in claim 15, wherein said first parameter is a shuttle speed of a video tape and said second parameter is a jogging speed of said video tape.

17. A variable rotary switch, comprising:
a first knob adapted to rotate about a vertical axis, said first knob having a first point of origin that rotates into a plurality of first radial positions about said vertical axis;
a second knob within said first knob, said second knob being adapted to rotate about said vertical axis relative to said first knob, said second knob having a second point of origin that rotates into a plurality of second radial positions about said vertical axis;
a button within said second knob, adapted to move along said vertical axis relative to said first and second knobs from a first to a second button position;
a hollow first shaft attached to said first knob that rotates with said first knob about said vertical axis, said first shaft extending along said vetical axis;
a hollow second shaft attached to said second knob that rotates with said second knob about said vertical axis, said second shaft being coaxial with said first shaft;
a third shaft attached to said button that moves with said button along said vertical axis, said third shaft being coaxial with said second shaft;
first sensor means operatively connected to said first shaft for determining said first radial positions of said first point of origin of said first knob;
second sensor means operatively connected to said second shaft for determining said second radial positions of said second point of origin of said second knob;
third sensor means operatively connected to said first and second knobs for sensing one first and one second knob positions of said first and second knobs;
fourth sensor means operatively connected to said third shaft for sensing said first and second button positions of said button; and,
magnetic clutch means operatively connected to said first shaft and said first sensor means for engaging said first shaft and preventing rotation of said first knob when said first point of origin of said first knob is in a predetermined first radial position.

18. The switch as recited in claim 17, further comprising plunger means operatively connected to said first knob and said third sensor means for allowing said first and second knobs to move along said vertical axis from said first to said second knob positions such that said third sensor means senses said first and second knob positions.

19. The switch as recited in claim 17, wherein said magnetic clutch means prevents said first knob from rotating each time said first point of origin of said first knob is rotated into one of a plurality of predetermined first radial positions.

20. The switch as recited in claim 17, further comprising computer means operatively connected to said sensor means and said magnetic clutch means for receiving input signals from said first sensor means when said first knob rotates into said predetermined first radial position and producing output signals to said magnetic clutch means in accordance with operating instructions within said computer means, said output signals cause said magnetic clutch means to engage said first shaft to prevent rotation of said first knob.

21. The switch as recited in claim 19, further comprising computer means operatively connected to said sensor means and said magnetic clutch means for receiving a plurality of corresponding input signals from said first sensor means when said first knob rotates into said plurality of predetermined first radial positions and producing output signals to said magnetic clutch means in accordance with operating instructions within said computer means, said output signals cause said magnetic clutch means to engage said first shaft to prevent rotation of said first knob.

22. The switch as recited in claim 20, wherein said computer means is adapted such that said operating instructions can be changed to a new set of operating instructions.

23. The switch as recited in claim 21, wherein said computer means is adapted such that said operating instructions can be changed to a new set of operating instructions.

24. The switch as recited in claim 17, wherein said first sensor means includes a first disk attached to said first shaft, said first disk having at least one first magnetic portion corresponding to said predetermined first radial position., said magnetic portion of said first disk being capable of being magnetically coupled to a first magnetically sensitive sensor located in a position fixed relative to said first disk, said first magnetically sensitive sensor causing said magnetic clutch means to engage said first knob when said first knob is rotated into said predetermined first radial position and said first disk rotates such that said first magnetic portion is magnetically coupled to said first magnetically sensitive sensor.

25. The switch as recited in claim 23, wherein said first sensor means includes a first disk attached to said hollow first shaft, said first disk having a plurality of first magnetic portions corresponding to said plurality of predetermined first radial positions, said magnetic portions of said first disk being capable of being magnetically coupled to a first magnetically sensitive sensor located in a position fixed relative to said first disk, said first magnetically sensitive sensor creating said plurality of corresponding input signals when said first knob is rotated into said predetermined first radial positions such that said first magnetic portions become magnetically coupled to said first magnetically sensitive sensor.

26. The switch as recited in claim 24, wherein said second sensor means includes a second disk attached to said second shaft, said second disk having at least one second magnetic portion corresponding to at least one predetermined second radial position, said second magnetic portion of said second disk being capable of being magnetically coupled to a second magnetically sensitive sensor located in a position fixed relative to said second disk.

27. The switch as recited in claim 25, wherein said second sensor means includes a second disk attached to said second shaft, said second disk having a plurality of second magnetic portions corresponding to a plurality of predetermined second radial positions, said second magnetic portions of said second disk being capable of being magnetically coupled to a second magnetically sensitive sensor located in a position fixed relative to said second disk, said second magnetic portions and said second magnetically sensitive sensor being magnetically coupled when said second knob is rotated into said predetermined second radial positions such that said second magnetic portions become magnetically coupled to said second magnetically sensitive sensor.

28. The switch as recited in claim 17, wherein said magnetic clutch means includes a first annular flange attached to said first shaft such that said first annular flange rotates with said first shaft, a coil operatively connected to said first annular flange, and a second annular flange being capable of being magnetically coupled to said coil and fixed relative to said first annular flange, such that when said first point of origin of said first knob is rotated into said predetermined first radial position, an electrical current is supplied to said coil by an electrical power means that induces a magnetic field in said coil which magnetically couples said second annular flange and said coil such that said first and second annular flanges are rigidly connected, wherein said connected flanges prevent said first shaft from rotating.

29. The switch as recited in claim 28, wherein said magnetic clutch means includes a metal spring that is pulled by said coil when said coil creates said magnetic field causing said first and second annular flanges to contact.

30. The switch as recited in claim 23, wherein said magnetic clutch means includes a first annular flange attached to said hollow first shaft such that said first annular flange rotates with said first shaft, a coil operatively connected to said first annular flange, and a second annular flange being capable of being magnetically coupled to said coil and fixed relative to said first annular flange such that when said computer means provides an output signal, an electrical current is supplied to said coil by an electrical power means that induces a magnetic field in said coil which magnetically couples said second annular flange and said coil such that said first and second annular flanges are rigidly connected, wherein said connected flanges prevent said first shaft from rotating.

31. The switch as recited in claim 25, wherein said magnetic clutch means includes a first annular flange attached to said first shaft such that said rotates with said first annular flange, a coil operatively connected to said first annular flange, and a second annular flange being capable of being magnetically coupled to said coil and fixed relative to said first annular flange such that when said computer means provides an output signal, an electrical current is supplied to said coil by an electrical power means that induces a magnetic field in said coil which magnetically couples said second annular flange and said coil that said first and second annular flanges are rigidly connected, wherein said connected flanges prevent said first shaft from rotating.

32. The switch as recited in claim 17, wherein said third sensor means includes an optical sensor coupled with a switch plate, said optical sensor emits a beam of light that is interrupted by said switch plate when said first and second knobs are in said first knob position, said beam of light not being interrupted by said switch plate when said first and second knobs are in said second knob position.

33. The switch as recited in claim 31, further comprising plunger means operatively connected to said first and second knobs and said third sensor means for allowing said first and second knobs to move along said vertical axis from said first to said second knob position such that said third sensor means senses said first and second knob positions.

34. The switch as recited in claim 33, wherein said third sensor means includes an optical sensor, coupled with a switch plate and operatively connected to said first and second knobs, and said plunger means to move into said first and said second knob positions, said optical sensor emits a beam of light that is interrupted by said switch plate when said switch plate is in said first knob position, said beam of light not being interrupted by said switch plate when said switch plate is in said second knob position.

35. The switch as recited in claim 31, wherein said first and second knobs and said button control first, second and third parameters respectively, each parameter having varying scales, wherein rotation of said knobs varies said scales of said first and second parameters and movement of said button from said first button position to said second button position varies said scales of said third parameter.

36. The switch as recited in claim 35, wherein said first parameter is a shuttle speed of a video tape, said second parameter is a jogging speed of said video tape and said third parameter controls movement of said video tape.

37. The switch as recited in claim 34, wherein said first and second knobs control first and second parameters respectively, each parameter having varying scales and said button and said plunger means each control a third parameter having a varying scale, wherein rotation of said knobs varies said scales of said first and second parameters and movement of said button from said first button position to said second button position varies said scales of said third parameter.

38. The switch as recited in claim 37, wherein said first parameter is a shuttle speed of a video tape, said second parameter is a jogging speed of said video tape and said third parameter controls movement of said video tape.

39. A console for setting and varying a video tape frame speed, comprising:
a housing;
control means within said housing for controlling a first, a second and a third parameter of the frame speed, each parameter having a varying scale;
a first knob adapted to rotate relative to said housing about a vertical axis, said first knob having a first point of origin that rotates into a plurality of first radial positions about said vertical axis, said first knob being operatively connected to said control means to control said first frame speed parameter in accordance with said first radial positions of said first point of origin;
a second knob within said first knob, said second knob being adapted to rotate about said vertical axis relative to said first knob, said second knob having a second point of origin that rotates into a plurality of second radial positions about said vertical axis, said second knob being operatively connected to said control means to control said second frame speed parameter in accordance with said second radial positions of said second point of origin;
a button within said second knob, adapted to move along side vertial axis relative to said first and second knobs from a first to a second button position, said button being operatively connected to said control means to control said third frame speed parameter in accordance with said position of said button;
a hollow first shaft attached to said first knob that rotates with said first knob about said vertical axis, said first shaft extending along said vertical axis;
a hollow second shaft attached to said second knob that rotates with said second knob about said vertical axis, said second shaft being coaxial with said first shaft;
a third shaft attached to said button that moves with said button along said vertical axis, said third shaft being coaxial with said second shaft;
first sensor means operatively connected to said first shaft for determining said first radial positions of said first point of origin of said first knob;
second sensor means operatively connected to said second shaft for determining said second radial positions of said second point of origin of said second knob;
third sensor means operatively connected to said first and second knobs for sensing one first and one second knob positions of said first and second knobs;
fourth sensor means operatively connected to said third shaft for sensing said first and second button positions of said button; and,
magnetic clutch means operatively connected to said first shaft and said first sensor means for engaging said first shaft and preventing rotation of said first knob when said first point of origin of said first knob is in a predetermined first radial position.

40. The switch as recited in claim 39, further comprising plunger means operatively connected to said first knob and said third sensor means for allowing said first and second knobs to move along said vertical axis from said first to said second knob position such that said third sensor means senses said first and second knob positions.

41. The switch as recited in claim 39, wherein said magnetic clutch means prevents said first knob from rotating each time said first point of origin of said first knob is rotated into one of a plurality of predetermined first radial positions.

42. The switch as recited in claim 39, further comprising computer means operatively connected to said sensor means and said magnetic clutch means for receiving input signals from said first sensor means when said first knob rotates into said predetermined first radial position and producing output signals to said magnetic clutch means in accordance with operating instructions within said computer means, said output signals cause said magnetic clutch means to engage said first shaft to prevent rotation of said first knob.

43. The switch as recited in claim 41, further comprising computer means operatively connected to said sensor means and said magnetic clutch means for receiving a plurality of corresponding input signals from said first sensor means when said first knob rotates into said plurality of predetermined first radial positions and producing output signals to said magnetic clutch means in accordance with operating instructions within said computer means, said output signals cause said magnetic clutch means to engage said first shaft to prevent rotation of said first knob.

44. The switch as recited in claim 42, wherein said computer means is adapted such that said operating instructions can be changed to a new set of operating instructions.

45. The switch as recited in claim 43, wherein said computer means is adapted such that said operating instructions can be changed to a new set of operating instructions.

46. The switch as recited in claim 39, wherein said first sensor means includes a first disk attached to said first shaft, said first disk having at least one first magnetic portion corresponding to said predetermined first radial position, said magnetic portion of said first disk being capable of being magnetically coupled to a first magnetically sensitive sensor located in a position fixed relative to said first disk, said first magnetically sensitive sensor causing said magnetic clutch means to engage said first knob when said first knob is rotated into said predetermined first radial position and said first disk rotates such that said first magnetic portion is magnetically coupled to said first magnetically sensitive sensor.

47. The switch as recited in claim 45, wherein said first sensor means includes a first disk attached to said first shaft, said first disk having a plurality first magnetic portions corresponding to said plurality of predetermined first radial positions, said magnetic portions of said first disk being capable of being magnetically coupled to a first magnetically sensitive sensor located in a position fixed relative to said first disk, said first magnetically sensitive sensor creating said plurality of corresponding input signals when said first knob is rotated into said predetermined first radial positions such that said first magnetic portions become magnetically coupled to said first magnetically sensitive sensor.

48. The switch as recited in claim 46, wherein said second sensor means includes a second disk attached to said second shaft, said second disk having at least one second magnetic portion corresponding to at least one predetermined second radial position, said second magnetic portion of said second disk being capable of being magnetically coupled to a second magnetically sensitive sensor located in a position fixed relative to said second disk.

49. The switch as recited in claim 47, wherein said second sensor means includes a second disk attached to said second shaft, said second disk having a plurality of second magnetic portions corresponding to a plurality of predetermined second radial positions, said second magnetic portions of said second disk being capable of being magnetically coupled to a second magnetically sensitive sensor located in a position fixed relative to said second disk, said second magnetic portions and said second magnetically sensitive sensor being magnetically coupled when said second knob is rotated into said predetermined second radial positions such that said second magnetic portions become magnetically coupled to said second magnetically sensitive sensor.

50. The switch as recited in claim 39, wherein said magnetic clutch means includes a first annular flange attached to said first shaft such that said first annular flange rotates with said first shaft, a coil operatively connected to said first annular flange, and a second annular flange being capable of being magnetically coupled to said coil and fixed relative to said first annular flange, such that when said first point of origin of said first knob is rotated into said predetermined first radial position, an electrical current is supplied to said coil by an electrical power means that induces a magnetic field in said coil which magnetically couples said second annular flange and said coil such that said first and second annular flanges are rigidly connected, wherein said connected flanges prevent said first shaft from rotating.

51. The switch as recited in claim 50, wherein said magnetic clutch means includes a metal spring that pushes said first and second annular flanges into contact when said coil creates said magnetic field.

52. The switch as recited in claim 45, wherein said magnetic clutch means includes a first annular flange attached to said first shaft such that said first annular flange rotates with said first shaft, a coil operatively connected to said first annular flange, and a second annular flange being capable of being magnetically coupled to said coil and fixed relative to said first annular flange such that when said computer means provides an output signal, an electrical current is supplied to said coil by an electrical power means that induces a magnetic field in said coil which magnetically couples said second annular flange and said coil such that said first and second annular flanges are rigidly connected, wherein said connected flanges prevent said first shaft from rotating.

53. The switch as recited in claim 47, wherein said magnetic clutch means includes a first annular flange attached to said first shaft such that said first annular flange rotates with said first shaft, a coil operatively connected to said first annular flange, and a second annular flange being capable of being magnetically coupled to said coil and fixed relative to said first annular flange such that when said computer means provides an output signal, an electrical current is supplied to said coil by an electrical power means that induces a magnetic field in said coil which magnetically couples said second annular flange and said coil such that said first and second annular flanges are rigidly connected, wherein said connected flanges prevent said first shaft from rotating.

54. The switch as recited in claim 39, wherein said third sensor means includes an optical sensor coupled with a switch plate and operatively connected to said first and second knobs, said optical sensor emits a beam of light that is interrupted by said switch plate when said first and second knobs are in said first knob position, said beam of light not being interrupted by said switch plate when said first and second knobs are in said second knob position.

55. The switch as recited in claim 53, further comprising plunger means operatively connected to said first knob and said third sensor means for allowing said first and second knobs to move along said vertical axis from said first to said second knob positions such that said third sensor means senses said first and second knob positions.

56. The switch as recited in claim 55, wherein said third sensor means includes an optical sensor coupled with a switch plate and operatively connected to said first and second knobs and said plunger means to move into said first and said second knob positions, said optical sensor emits a beam of light that is interrupted by said switch plate when said switch plate is in said first knob position, said beam of light not being interrupted by said switch plate when said switch plate is in said second knob position.

57. The switch as recited in claim 53, wherein said first parameter is a shuttle speed of a video tape, said second parameter is a jogging speed of the video tape and said third parameter controls movement and playing of the video tape, wherein rotation of said first knob varies said shuttle speed of the video tape, rotation of said second knob varies said jogging speed of the video tape and said button starts and stops playing of video tape.

58. The switch as recited in claim 56, wherein said first parameter is a shuttle speed of a video tape, said second parameter is a jogging speed of the video tape and said third parameter controls movement and playing of the video tape wherein rotation of said first knob varies said shuttle speed of the video tape, rotation of said second knob varies said jogging speed of the video tape, said button starts and stops playing of the video tape and said plunger means stops playing of video tape.

* * * * *